United States Patent Office 2,851,482
Patented Sept. 9, 1958

2,851,482

L-ARGININE-L-GLUTAMATE

Norval G. Barker, Robbinsdale, and Robert W. H. Chang, St. Paul, Minn., assignors to General Mills, Inc., a corporation of Delaware No Drawing. Application May 20, 1957
Serial No. 660,065

2 Claims. (Cl. 260—501)

This invention relates to the novel and useful salt, L-arginine-L-glutamate. This salt is useful as a sodium-free seasoning, especially for meats.

This salt may be prepared by mixing L-arginine with L-glutamic acid in water and crystallizing the resulting salt from the water by the addition of a polar water miscible organic solvent to the water. For instance, when 17.2 grams of L-arginine and 14.5 grams of L-glutamic acid were dissolved in 155 grams of water, a clear homogeneous solution resulted which had a pH of 5.3. This solution was filtered and the filtrate was evaporated at 50° C. under reduced pressure to a solution having a solids content of about 45%. Absolute methanol (220 grams) was added to the concentrated solution of the salt and this mixture cooled to 5° C. for one hour. The resulting solid salt was removed from the mixture by filtration and washed with absolute methanol. After being dried preliminarily in the air, the salt was further dried in a vacuum oven at 60° C. for 3 hours. The resulting salt, L-arginine-L-glutamate, weighed 30 grams (94.6% of the theoretically possible yield based on the amount of L-arginine and L-glutamic acid employed) and melted at 193–194.5° C. with decomposition.

The infrared spectra of L-arginine-L-glutamate was studied in comparison to the spectra for L-arginine, L-glutamic acid, a 1:1 mixture of L-arginine and L-glutamic acid and sodium L-glutamate. The spectrum of the L-arginine-L-glutamate salt differed considerably from the spectra for L-arginine, L-glutamic acid and the mixture of the two. The most significant difference was the presence of a strong band at 6.3 microns for the salt whereas the free compounds and the mixture did not have this band. In the spectrum for the salt, sodium L-glutamate, there was a similar band at 6.4 microns.

Many modifications and variations of the invention as hereinbefore set forth may be made without departing from the spirit and scope thereof, and therefore only such limitations should be imposed as are indicated in the appended claims.

Now, therefore, we claim:

1. L-arginine-L-glutamate.
2. The process of preparing L-arginine-L-glutamate which comprises dissolving L-arginine and L-glutamic acid in water, crystallizing L-arginine-L-glutamate and separating the crystalline L-arginine-L-glutamate.

No references cited.